United States Patent [19]

Alexander

[11] Patent Number: 5,774,920
[45] Date of Patent: Jul. 7, 1998

[54] ELECTRICALLY ACTUATED DOCK LEVELER

[75] Inventor: James C. Alexander, London, Canada

[73] Assignee: United Dominion Industries, Inc., Charlotte, N.C.

[21] Appl. No.: 650,823

[22] Filed: May 20, 1996

[51] Int. Cl.⁶ .................................................. E01D 1/00
[52] U.S. Cl. ........................ 14/71.3; 14/69.5; 14/71.1
[58] Field of Search ......................... 14/69.5, 71.1, 14/71.3

[56] References Cited

U.S. PATENT DOCUMENTS

| | | | |
|---|---|---|---|
| Re. 30,250 | 4/1980 | Catlett | 14/71.3 |
| 2,904,802 | 12/1959 | Hartman | 14/71 |
| 3,235,896 | 2/1966 | Riggs | 14/71.3 |
| 3,454,974 | 7/1969 | Kumpolt | 14/71.3 |
| 3,475,778 | 11/1969 | Merrick et al. | 14/71.3 |
| 3,500,486 | 3/1970 | Le Clear | 14/71.3 |
| 3,528,118 | 9/1970 | Smith | 14/71.3 |
| 3,579,696 | 5/1971 | Hecker, Jr. et al. | 14/71.3 |
| 3,584,324 | 6/1971 | Merrick | 14/71.3 |
| 3,699,601 | 10/1972 | Hecker, Jr. et al. | 14/71 |
| 4,012,804 | 3/1977 | Catlett | 14/71.3 |
| 4,020,517 | 5/1977 | Waddell | 14/71.5 |
| 4,081,874 | 4/1978 | Artzberger | 14/71.7 |
| 4,097,949 | 7/1978 | Barrett | 14/71.3 |
| 4,110,860 | 9/1978 | Neff et al. | 14/71.7 |
| 4,343,058 | 8/1982 | Loblick | 14/71.7 |
| 4,364,137 | 12/1982 | Hahn | 14/71.3 |
| 4,455,703 | 6/1984 | Fromme et al. | 14/71.3 |
| 4,703,534 | 11/1987 | Pedersen | 14/71.1 |
| 4,800,604 | 1/1989 | Alten | 14/71.3 |
| 4,827,549 | 5/1989 | Walker | 14/71.7 |
| 4,922,568 | 5/1990 | Hageman | 14/71.3 |
| 4,944,062 | 7/1990 | Walker | 14/71.3 |
| 5,088,143 | 2/1992 | Alexander | 14/69.5 |
| 5,303,443 | 4/1994 | Alexander | 14/71.1 |
| 5,323,503 | 6/1994 | Springer | 14/71.3 |
| 5,440,772 | 8/1995 | Springer et al. | 14/69.5 |
| 5,500,968 | 3/1996 | Hodges | 14/71.7 |
| 5,586,356 | 12/1996 | Alexander | 14/71.1 |

*Primary Examiner*—Tamara L. Graysay
*Assistant Examiner*—Gary S. Hartmann
*Attorney, Agent, or Firm*—Sughrue, Mion, Zinn, Macpeak & Seas, PLLC

[57] ABSTRACT

A dock leveler having a frame adapted to be fixedly mounted at a dock with a deck, pivotedly mounted to the frame at one end thereof, and having a pivotable lip at the other end. A spring is mounted to the deck and the frame and supports the deck. An electric actuator is coupled to the deck and the frame and moves the deck from a generally horizontal stored position into an operative position. A control circuit is employed for controlling operation of the electrical actuator. The actuator carries a limit switch which is responsive to movement so that power is terminated to the actuator when the deck reaches either a stored or operative position.

20 Claims, 6 Drawing Sheets

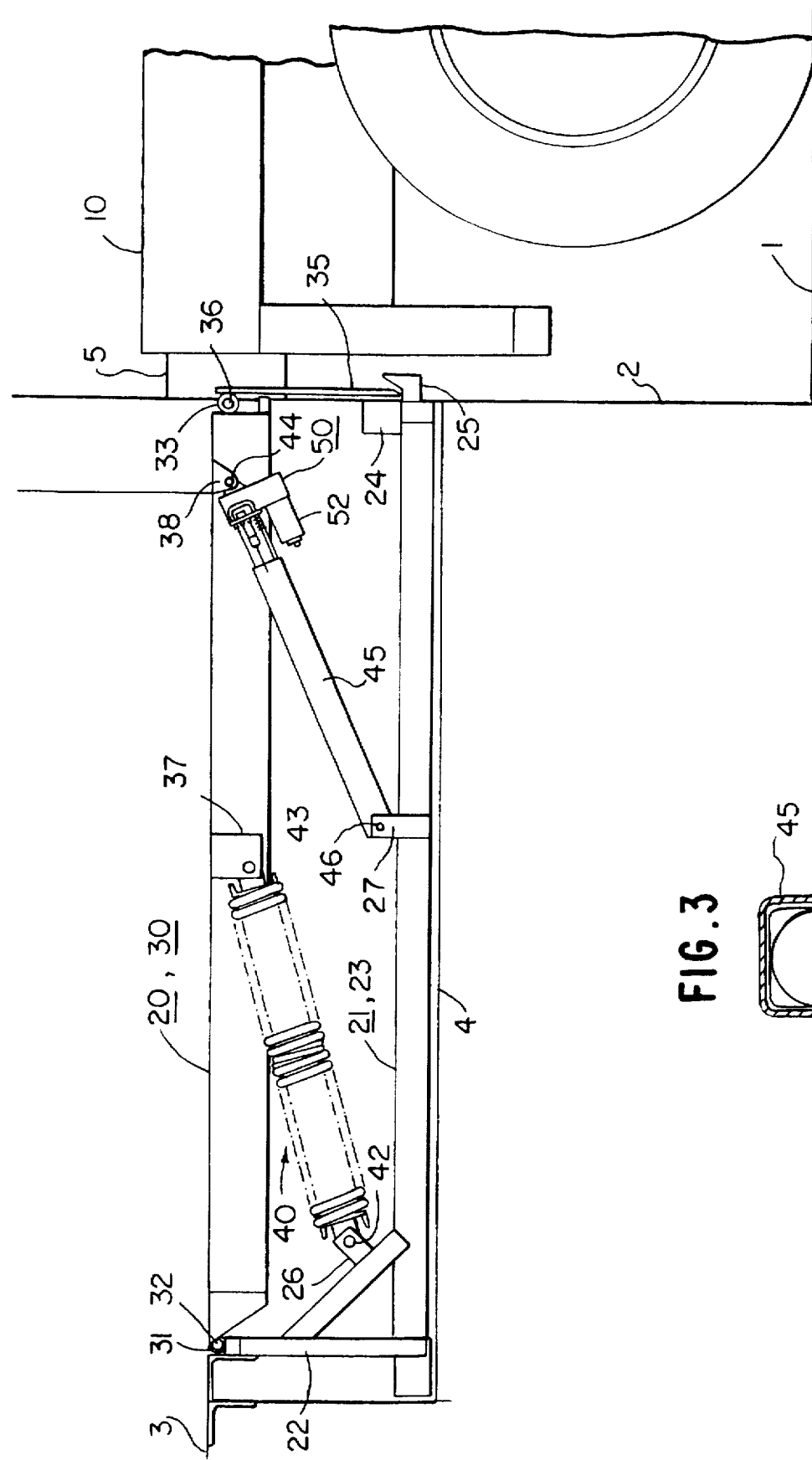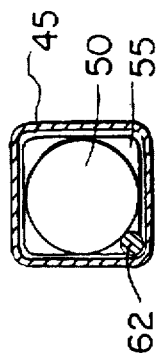

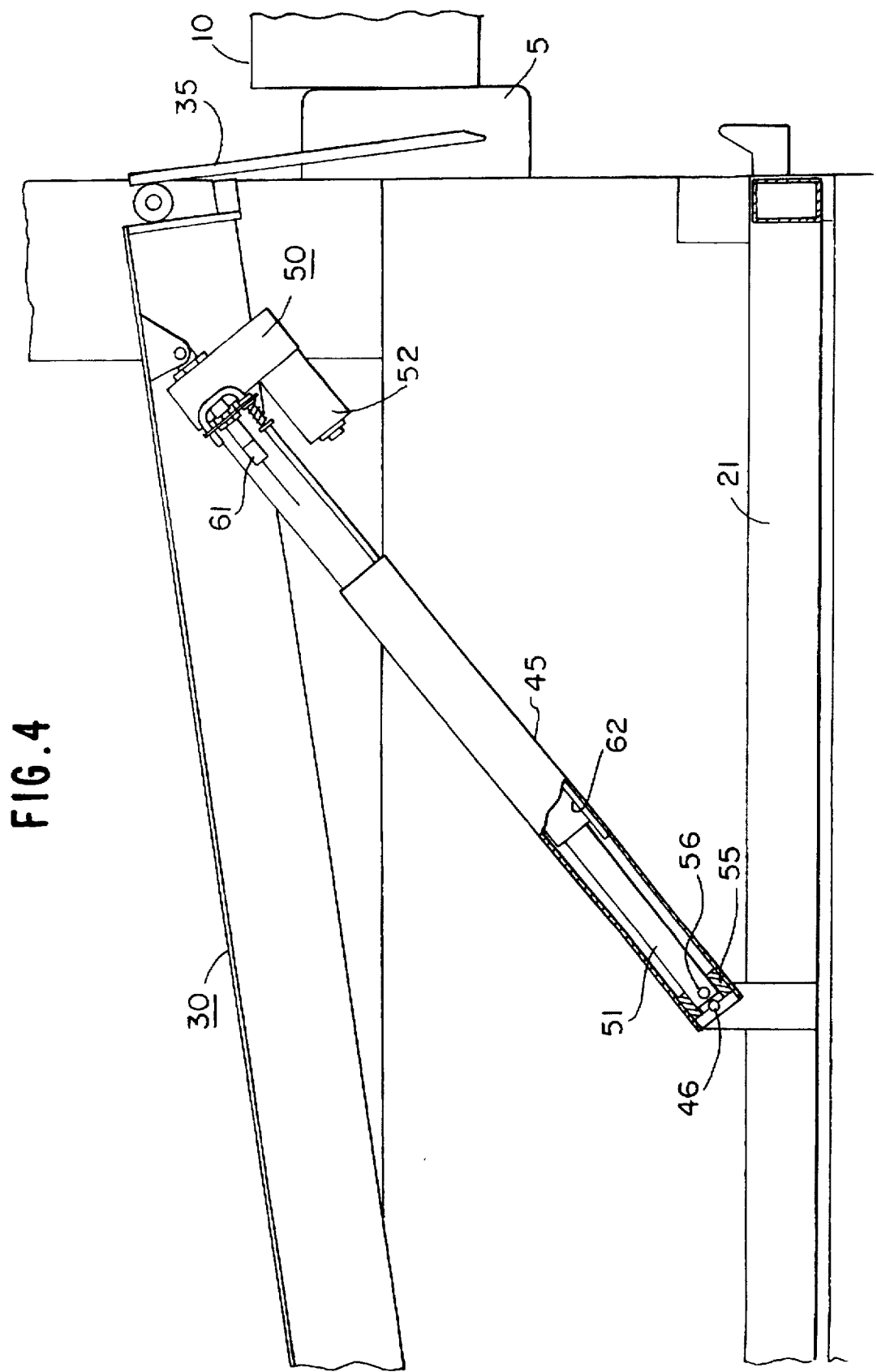

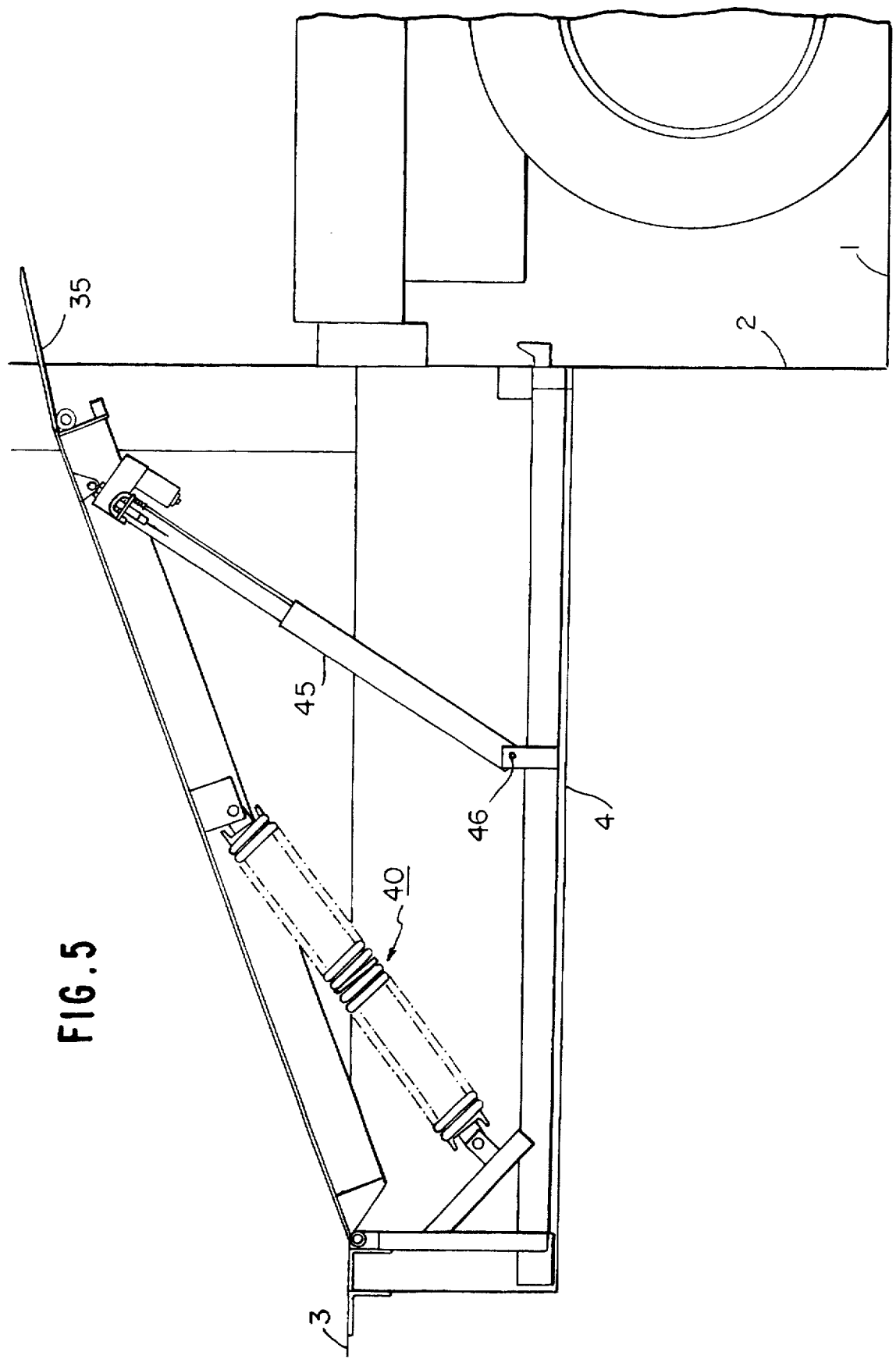

ELECTRICALLY ACTUATED DOCK LEVELER

BACKGROUND OF THE INVENTION

1. Field of the Invention

This invention relates to loading dock equipment and in particular to dock levelers using an electric actuator to move the dock leveler.

2. Prior Art

Pit-style dock levelers are manufactured in a wide range of models to meet various requirements of price and performance. They can be divided into a number of different types as a function of the mode of power. Mechanical dock levelers are the most common because of their low cost. They are widely available and for reference purposes U.S. Pat. No. 3,997,932 illustrates one example of such a mechanical dock leveler.

This type of dock leveler employs different techniques of powering the device. Manual lift mechanical dock levelers are common and again, low cost devices. However, operation requires the user bending over and lifting the unit. Another common type is the walk-down mechanical dock leveler. This requires less effort since the device is biased upward and the weight of the user "walks down" the device. However, the hold down requires maintenance and adjustment is required to maintain accurate spring balance.

A second type is the hydraulic dock leveler which features ease of use but at higher cost due to the hydraulics which are employed as the mode of power. A varient is the hydraulic dock leveler with mechanical lip extension. This device has moderate cost when compared with an hydraulic dock leveler with hydraulic lip extension. The latter device provides better control of lip motion but at a higher cost compared with those having mechanical lip extension.

Contemporary safety and liability issues indicate a trend to move away from manually operated dock levelers. However not all applications can justify the cost of a hydraulic dock leveler. Also, some customers such as food and other environmentally conscious industries prefer non-hydraulic products to eliminate potential problems from hydraulic fluid spills.

One device being offered to meet these demands replaces the hydraulic system with a blower and inflatable air bag to raise the dock leveler. This is illustrated in one form in U.S. Pat. No. 5,042,103. While this design provides a solution to some of the needs in the industry, it has two deficiencies. First, the air bag occupies most of the pit, making visual inspection and cleaning of the pit difficult. It will be appreciated that debris and the like frequently collect around the pit area. Secondly, the air bag lift system does not have a capability to hold the leveler in a raised position for an "Emergency Stop" condition. Moreover, it requires two people to install a support post under the leveler for maintenance, one to press the "Raise" button and one to place the support post under the deck.

Other configurations have been proposed using a large electric actuator to replace the hydraulic system, but large actuators commercially available are more expensive than hydraulic systems. Consequently, there exists in the dock loading industry a need for a simple yet powered dock leveler.

SUMMARY OF INVENTION

This invention uses an electric actuator to power a "manual lift" dock leveler, the least expensive type of mechanical pit-style dock leveler. Mechanical springs are used to partially offset the weight of the deck but the deck is still downward biased. The springs are used to reduce the force required by the electric actuator since the cost of actuators with lifting capacities over 1000 pounds would not provide a cost advantage over hydraulic dock levelers. Also, the spring counterbalance enables the deck to be easily lifted by hand for maintenance. The electric actuator provides a clean source of power and leaves the dock leveler pit open for easy inspection and cleaning.

Unlike a hydraulic cylinder which can "float", an electric actuator cannot follow the up and down motion of a dock leveler with the lip resting on a trailer. Most devices which use an electric actuator require separate control buttons to extend and retract mechanism. This invention however provides for "float" of the electric actuator and also a method of control where the dock leveler has a single "Raise" button. As a result the operation is similar to the more familiar hydraulic dock leveler. In addition, an optional "Emergency-Stop" switch can be added to the electrical control system to allow the dock leveler to be held in the raised position to avoid damage to cargo on a transport vehicle, or for maintenance.

This invention will be described with reference to the drawing and the description of the preferred embodiment that follows.

BRIEF DESCRIPTION OF THE DRAWING

FIG. 1 is a side view of a typical dock and transport vehicle and a partial section of the dock leveler showing the essential components;

FIG. 3 is a cross-sectional view of the electric actuator, guide tube and limit switch sensor bar;

FIG. 4 is side view of the dock leveler and a partial sectional view of the electric actuator partially extended to raise the dock leveler;

FIG. 5 is a side view illustrating the dock leveler fully raised with the lip extended;

DESCRIPTION OF THE PREFERRED EMBODIMENTS

Figure 2:
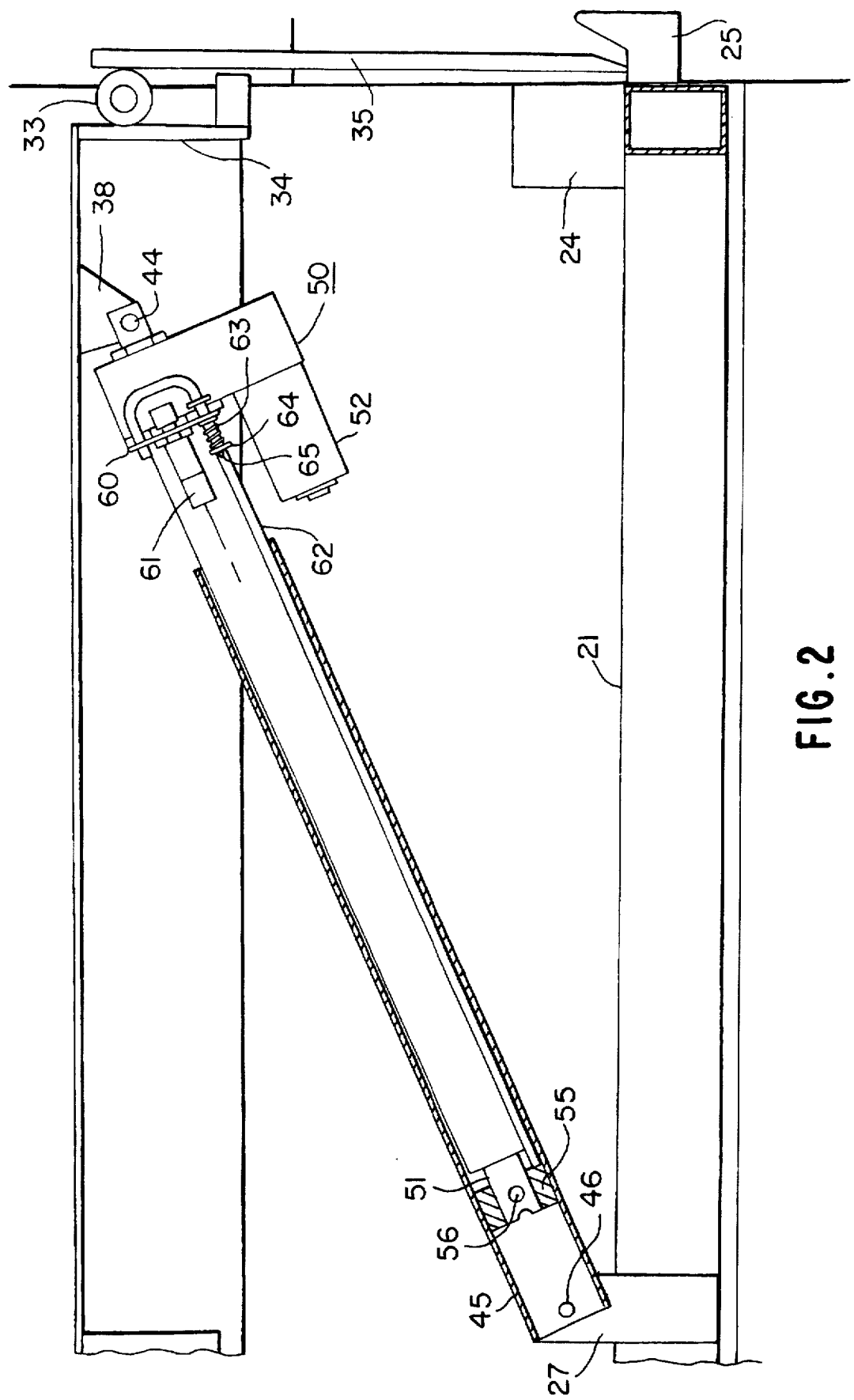
FIG. 2 is a side sectional view of the actuator, float mechanism and limit switch activation components of the dock leveler.

Referring now to FIG. 1, a side view of a typical loading dock is which has a driveway approach 1, a dock face 2 and a dock floor 3. A pit 4 is formed in the dock floor 3. Dock bumpers 5 limit the position of the transport vehicle 10 relative to the dock face 2. A dock leveler 20 has a frame 21 attached to the pit 4. The frame has vertical back frame members 22 with holes for the hinge pivot pin 32 near the top. Horizontal frame members 23 extend forward to the front of the pit 4 and have ramp stops 24 and lip keepers 25. A deck 30 has rear hinge supports 31. The deck 30 is attached to the frame 21 by a hinge pin 32.

Referring to FIGS. 1 and 2, lip hinge tubes 33 are fastened to the front bar 34 of the deck assembly. A lip 35 is connected to the deck hinge tubes by a lip hinge pin 36. The end of the lip rests in the lip keepers 25 and supports the deck assembly in the stored "cross-traffic" position. A spring assembly 40 is fastened to brackets 26 on the frame 21 by a pin 42 and to brackets 37 on the deck assembly by a pin 43. The spring assembly 40 is employed to support a substantial amount of the weight of deck assembly so that the actuator force is sufficient to raise the deck. The spring assembly supports the deck throughout the entire range of travel. By way of example, the spring assembly may be selected to support 60% to 80% of the deck weight.

An electric actuator 50 with an extendible rod 51 is fastened to brackets 38 on the deck 30 by a pin 44. A square guide tube 45 is fastened by a pin 46 to brackets 27 on the frame 20. The majority of the weight of the deck 30 is carried by the counterbalancing force of the spring assembly 40, and the actuator 50 is required to provide only the extra force to raise the deck and extend the lip.

FIG. 2 is a sectional view of the guide tube 45 and the actuator 50. A typical electric actuator has a screw and nut mechanism which requires that the extendible rod 51 be prevented from rotating. As illustrated in FIG. 3, a square boss 55 is attached to the end of the rod 51 by a pin 56. The boss 55 will slide easily inside the tube 45, but it will not rotate. A plate 60 is attached to the actuator and carries a limit switch 61. The switch shown is a proximity sensor which closes an electrical circuit when it senses a conductive metal. A sensor bar 62 is guided by holes in the plate 60 and has the opposite end fitted inside the square tube 45 as shown in a cross sectional view in FIG. 3. A spring 63 is held on the bar 62 by a washer 64 and a pin 65, and urges the U-bend end of the bar 62 into proximity with the switch 61. When the extendible actuator rod 51 is fully retracted as shown in FIG. 2, the boss 55 pushes against the end of the sensor bar 62, compresses the spring 64 and moves the bent end of the bar away from the sensor switch 61. Thus the switch can indicate when the actuator rod 51 is fully retracted.

Figure 6:
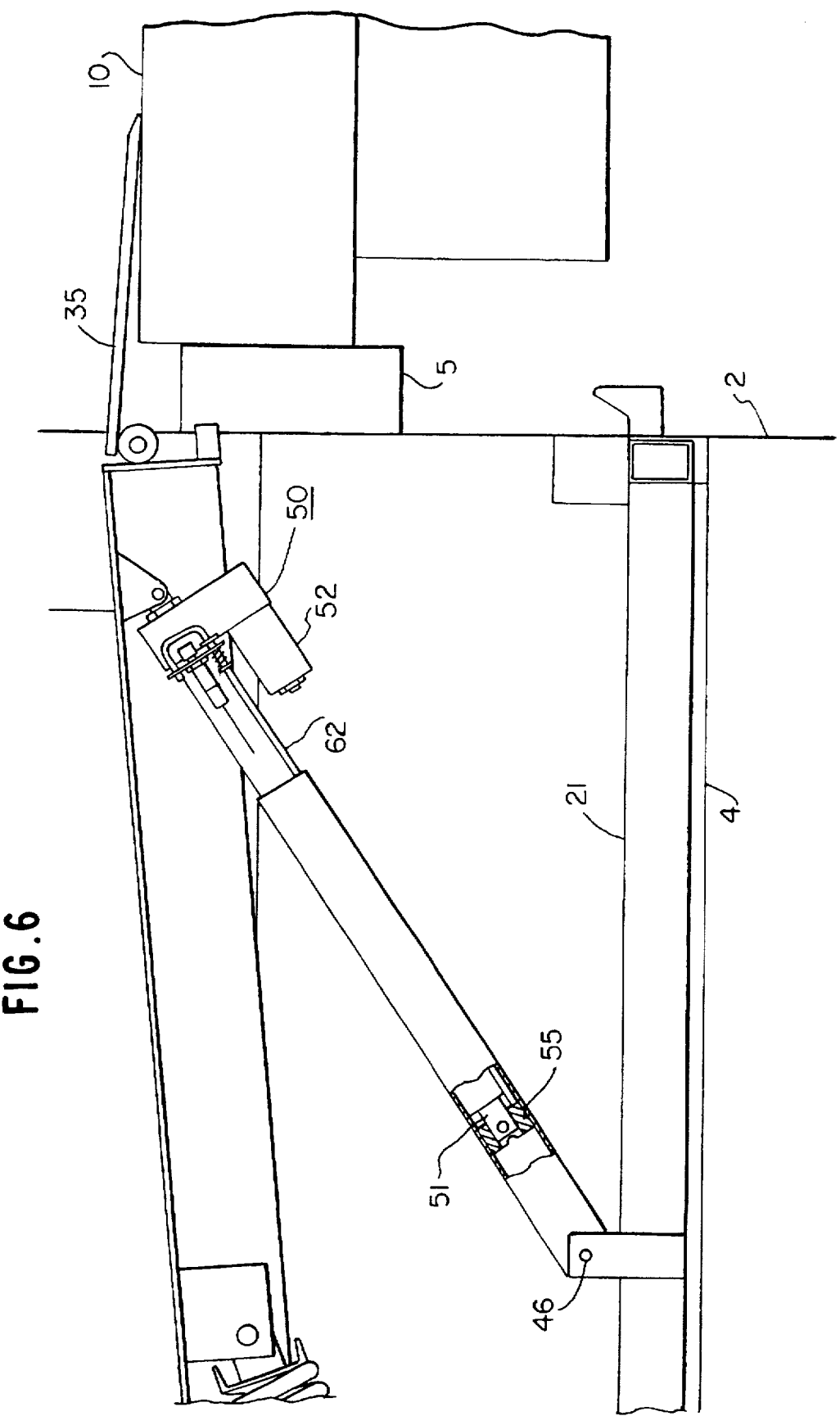
FIG. 6 is a side view illustrating the dock leveler supported by the lip resting on the bed of a transport vehicle, and a partial section of the electric actuator retracted to the float position.

The operation of the system will be described relative to FIGS. 4–7. FIG. 4 illustrates the dock leveler as the electric actuator is extending while the operator presses a control button. The boss 55 at the end of the rod 51 has engaged the pin 46 on the frame 21 (compare with FIG. 2). This fixes the position of the rod relative to the fixed frame. As the electric actuator continues to extend, as illustrated in FIG. 5, the deck 30 is lifted upward. When the deck is fully raised as shown in FIG. 5, the lip is then extended by a conventional lip extension mechanism, not shown. When the lip has extended, the operator releases the button and the actuator rod 51 begins to retract. The leveler lowers until the lip 35 rests on the trailer as shown in FIG. 6 and the actuator continues to run until the rod 51 is fully retracted. Thus the boss 55 slides freely inside the tube 45 and the leveler is able to move up and down with the vehicle.

When the loading is completed, the dock leveler is restored in the same manner as it was extended. When the Raise button 80 is pressed, the actuator extends and lifts the deck, allowing the lip to fall. The operator then releases the Raise button before the deck is raised high enough to cause the lip to extend and the actuator rod 51 begins to retract. The dock leveler lowers until the tip of the lip 35 rests on the lip keepers as shown in FIG. 1 and the actuator continues to run until the rod 51 is fully retracted.

Figure 7:
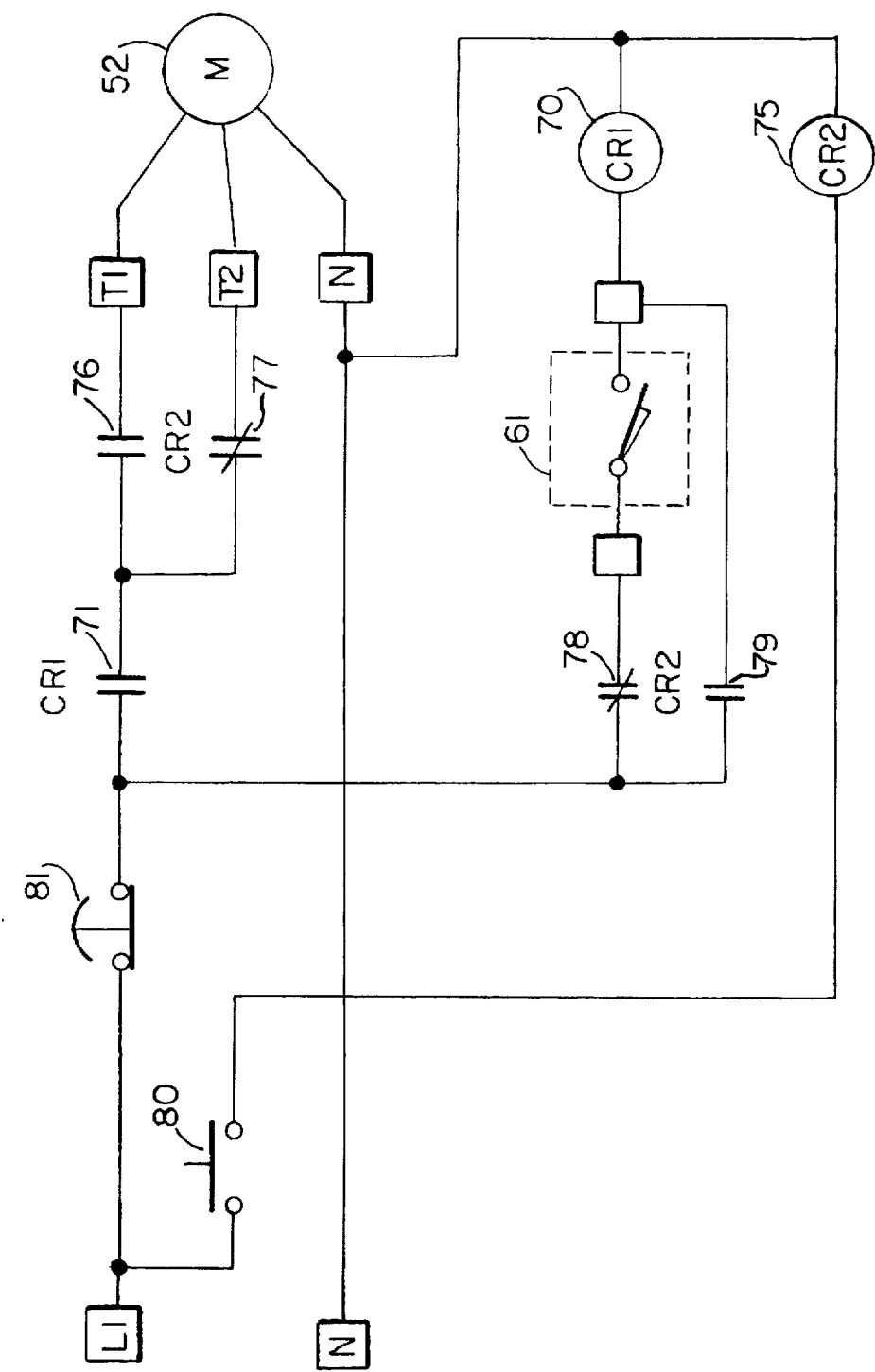
FIG. 7 is a circuit diagram of the electrical control circuit which provides single button operation of the dock leveler.

The electric control circuit is shown schematically in FIG. 7. The electrical circuit uses a single push button 61 to cause the actuator to extend, releasing the sensor bar 62 and allowing it to engage the limit switch 61. When the operator releases the button, the motor 52 reverses direction and the rod 51 retracts. When the rod 51 is fully retracted, the boss 55 engages the end of the sensor bar 62, disengaging the switch 61 and stopping the motor. As shown on FIG. 7, the electric motor 52 has three wires connected to terminals T1, T2 and N. A relay 70 has a normally open contact 71. A relay 75 has normally open contacts 76 and 78 and normally closed contacts 77 and 79. When the dock leveler is at rest, the switch 61 is open and the motor 51 is not energized.

When the Raise button 80 is pressed, the relay 75 is energized and causes the contacts 77 and 78 to open and the contacts 76 and 79 to close. Power flows through contact 79 to the relay 70 which then provides power through contacts 71 and 76 to terminal T1 of the motor 52 and the actuator extends to raise the deck. As the actuator begins to extend, the limit switch 61 closes. When the lip is extended, the operator releases the raise button 80. The relay 75 is not energized and power flows through the contact 78 and switch 61 to maintain power to the relay 70. Power continues through contact 71 but is now directed through contact 77 to terminal T2 of the motor 52. The motor 52 now runs in reverse and the actuator retracts, lowering the deck 30. When the actuator is fully retracted, the limit switch 61 opens and the motor stops. The deck is now in an operative position supported by the lip and the spring, with the actuator retracted.

FIG. 7 also illustrates an optional "Emergency-Stop" switch 81 which can be added to the electrical control system to interrupt power to the motor 52 and allow the dock leveler to be held in the raised position during operation or for maintenance.

The electrical circuit shown in FIG. 7 employs an alternating current (AC) motor. A similar circuit could be constructed to control a direct current (DC) motor. It is apparent that other modifications can be made within the scope of this invention.

I claim:

1. A dock leveler comprising:
   a frame adapted to be fixedly mounted at a dock;
   a deck, pivotedly mounted to said frame at one end thereof, and having a pivotable lip at the other end thereof;
   a compression spring attached to said deck and said frame to support said deck independently from said actuator:
   an electric actuator coupled to said deck and said frame, said electric actuator moving said deck from a generally horizontal stored position into an operative position, and a circuit for controlling operation of said electrical actuator.

2. A dock leveler according to claim 1 further comprising, a limit switch carried by said actuator and responsive to actuator movement to terminate actuator operation when said deck is in said operative position.

3. A dock leveler according to claim 1 wherein said electric actuator comprises a reversible electric motor, said circuit comprises a source of electrical power and means for driving said actuator in a first direction until said deck is lifted, and said circuit including means to reverse the movement of said actuator to lower said deck.

4. A dock leveler according to claim 3 wherein said circuit means to reverse movement of said actuator includes a switch and a relay, wherein when said switch is open said relay is energized to reverse current to said electric motor and thereby reverse movement of said actuator.

5. A dock leveler according to claim 1 wherein said actuator comprises an extensible rod carrying a boss at one end, said boss slidable in a guide tube, a limit switch carried by said actuator and having an arm with one end in proximity to said limit switch and other end extending in said tube, a spring to bias said one end into position to trigger said limit switch and said boss movable as said actuator retracts to engage said other end of said arm to move said arm away from said limit switch and thereby cease power to said actuator.

6. A dock leveler according to claim 5, wherein said guide tube is generally rectangular and said boss slides in said guide tube, said extensible rod being generally circular wherein a space exists within said guide tube for said arm to run generally axial to said extensible rod.

7. A dock leveler according to claim 1 wherein said electric actuator comprises a reversible electric motor driving an extensible rod, circuit comprises source of electrical power selectively coupled to said electric motor, a normally open contact switch, a first relay to power said motor in one direction, a second relay to power said motor in an opposite direction and a limit switch responsive to movement of said extensible rod to terminate power to said motor.

8. A dock leveler according to claim 1 further comprising a guide tube for said actuator, said guide tube also housing a movable arm, a limit switch carried by said actuator and responsive to movement of said arm to terminate power to said actuator as said actuator retracts.

9. A dock leveler according to claim 8 wherein said actuator carries a boss within said guide tube, a stop coupled to said frame to engage said boss such that further movement of said actuator raises said deck.

10. A dock leveler of claim 1 wherein said compression spring is attached to said deck and said frame to be in substantial alignment with said actuator when said deck is in said generally horizontal stored position.

11. A docket leveler of claim 1 wherein said compression spring supports 60 to 80% of said deck weight.

12. A pit type dock leveler comprising:

a frame fixedly mounted in a pit at a dock;

a pivotal deck mounted to said frame at one end of the deck;

an electric actuator coupled to said deck and said frame, said electric actuator moving said deck form a generally horizontal stored position into an operative position, a guide tube for said actuator, said guide tube also housing a movable arm, a limit switch carried by said actuator and responsive to movement of said arm to terminate power to said actuator as said actuator retracts.

13. A dock leveler according to claim 12 further comprising, a limit switch carried by said actuator and responsive to actuator movement to terminate actuator operation when said deck is in said operative position.

14. A dock leveler according to claim 12 wherein said electric actuator comprises a reversible electric motor, a control circuit comprising a source of electrical power and means for driving said actuator in a first direction until said deck is lifted, and said circuit including means to reverse the movement of said actuator to lower said deck.

15. A dock leveler according to claim 14 wherein said control circuit means to reverse movement of said actuator includes a switch and a relay, wherein when said switch is open said relay is energized to reverse current to said electric motor and thereby reverse movement of said actuator.

16. A dock leveler according to claim 12 wherein said actuator comprises an extensible rod carrying a boss at one end, said boss slidable in a guide tube, a limit switch carried by said actuator and having an arm with one end in proximity to said limit switch and other end extending in said tube, a spring to bias said one end into position to trigger said limit switch and said boss movable as said actuator retracts to engage said other end of said arm to move said arm away from said limit switch and thereby cease power to said actuator.

17. A dock leveler according to claim 16, wherein said guide tube is generally rectangular and said boss slides in said guide tube, said extensible rod being generally circular wherein a space exists within said guide tube for said arm to run generally axial to said extensible rod.

18. A dock leveler according to claim 12 wherein said electric actuator comprises a reversible electric motor driving an extensible rod, a control circuit comprising a source of electrical power selectively coupled to said electric motor, a normally open contact switch, a first relay to power said motor in one direction, a second relay to power said motor in an opposite direction and a limit switch responsive to movement of said extensible rod to terminate power to said motor.

19. A dock leveler according to claim 12 wherein said actuator carries a boss within said guide tube, a stop coupled to said frame to engage said boss such that further movement of said actuator raises said deck.

20. A dock leveler according to claim 12 further comprising a compression spring supporting said deck independent of said actuator.

\* \* \* \* \*